UNITED STATES PATENT OFFICE.

LUDWIG H. REUTER, OF BERKELEY, CALIFORNIA.

COATING COMPOSITION.

1,107,356.  Specification of Letters Patent.  Patented Aug. 18, 1914.

No Drawing.  Application filed April 6, 1908.  Serial No. 425,442.

*To all whom it may concern:*

Be it known that I, LUDWIG H. REUTER, a citizen of the United States, residing at Berkeley, in the county of Alameda and State of California, have invented a new and useful Coating Composition, of which the following is a specification.

This invention relates to a composition of matter capable of use for several purposes.

The principal objects of the invention are to provide a perfect bond in the form of the fixative coating between foundations and magnesite cement laid thereon so as to unite the foundation to the magnesite cement in such a way as to prevent the absorption by the foundation of the salt solutions used in the magnesite cement, which weakens the latter, and in this way to greatly increase the durability of such structures; also to provide a composition for this purpose which will fill all the cracks and fissures of the foundation whether made of wood, cement, concrete, plaster of Paris, artificial or natural stones, or the like, and which will adhere firmly thereto.

Further objects of the invention are to provide a composition which may be varied to suit the conditions of comparatively dry and moist climates or weather; to provide a composition which while particularly useful for the above mentioned purposes, will be very efficient for the purpose of fire-proofing shingles or other wooden articles, roofing-paper, and the like, and which can be used most efficiently for mineralizing coarse sawdust so as to render the same practically non-combustible, and also which will be useful as a plastic composition to apply to bandages in place of plaster of Paris for surgical purposes.

Further objects and advantages of the invention will appear hereinafter.

Heretofore so-called water-proof and damp-proof paint preparations, made from asphaltum, gilsonite, elaterite, coaltar, etc., have been used as coatings for foundations previous to the putting down of the magnesite cement. Attempts have been made also to secure a better union between the foundation and cement layer by roughening or pricking the foundation, if made of cement, or concrete; or by driving in nails or tacks half way, or nailing down wire-screening, if the foundation was of wood. All these and similar methods have proved to be failures, as they did not involve the use of any means between the foundation and the magnesite cement for effectively preventing the absorption by the foundation when of wood, of the salt solutions used in the preparation of the magnesite cement, which by reason of the smaller or larger loss of these salts by absorption, was not obtainable in a strong and durable enough condition to stand the strain of the traffic. As a matter of fact such magnesite cements or floorings had to be replaced in a relatively short time by new ones, equally weak and becoming loose or disintegrated likewise in a short time. Furthermore, on cement coated with one of the above mentioned paint preparations, the magnesite cement did not stick at all.

Now I have discovered that a thorough and solid bond between the foundation and magnesite cement cannot be effected by mechanical means, viz. paint compositions having relationship or affinity neither to the foundation nor to the magnesite cement, nor can a proper union be effected by using nails and the like. I have found that the only effective means of binding the foundation intimately to the magnesite cement consists in using a fixative coating, comprising materials combining with the oxid of magnesium contained in the calcined magnesite. If such a preparation is diluted with water to the consistency of thin cream and painted once, but preferably twice, over the foundation whether the same is wood, stone, cement, or the like, a coating results, which, while filling all the cracks and fissures of the foundation and adhering firmly to the foundation, yields a perfect chemical bond with the top layer, namely magnesite cement. If two coats of this fixative coating preparation are properly applied and at least the first coating allowed to get dry, there will be no possibility of loss of the essential liquid elements contained in the magnesite cement by absorption from below, and the magnesite cement put down on such coatings will become so hard, tough, and durable in addition to its increased fire-proof and water-proof character, that it will withstand for years the severest strain not only inside, but also outside. In the open air, for instance, on side-walks, porches, etc., it will resist continuous exposure to rain and changes of temperature without changing in the least its original durability and without becoming soft or disintegrated. The composition for this purpose consists of magnesium oxid, preferably obtained by calcining a substance containing magnesium carbonate, as magnesite or dolomite, combined with soluble magnesium salts capable of combining with the magnesium oxid. I find also that climatic conditions, viz. temperature and moisture of the atmosphere have to be carefully considered in so far as the composition of the fixative binder is concerned; for instance, during warm and dry weather, a composition is preferable containing in addition to calcined magnesite a mixture of chlorid and sulfate of magnesium, yet containing more chlorid, than sulfate; the predominance of chlorid over the sulfate is desirable, because warm and dry weather sometimes tends to procure an altogether too quick drying and setting, and because the chlorid does not yield coatings, setting and hardening as quickly as coatings containing sulfate, hence, the larger amount of chlorid.

During the rainy season I prefer to use a composition containing more sulfate of magnesium than chlorid, by reason of the retarding effect moisture has on the setting of this coating on one hand, and the quicker setting tendency of the sulfate on the other hand. While I prefer to use during dry and warm weather chlorid containing 1 to 5 per cent. of sulfate of magnesium, I have, during the rainy season, obtained good results by means of a sulfate containing 1 to 5 per cent. of chlorid of magnesium. As an example of a way of making the composition, in dry weather I prefer to use a mixture comprising about 60–70 pounds of calcined magnesite and 20–30 pounds of dry chlorid of magnesium, the latter containing about 1 to 5 per cent. of anhydrous sulfate of magnesium; while in rainy weather I prefer the use of a mixture comprising about 60–70 pounds of calcined magnesite and 20–30 pounds of anhydrous sulfate of magnesium, the latter containing 1 to 5 per cent. of chlorid. These preparations are mixed with about half their weight of cold water; the mixture is macerated for a couple of minutes and then applied by means of a brush, or in any other convenient way. Before putting down a magnesite cement mixture on the foundation, I usually apply two coatings, of which the first one should be allowed to get dry, while the second may be still wet when the magnesite cement is put down. I have found that if my invention is followed, the most perfect chemical union results between the foundation and the magnesite cement; and a very durable, strong, and tough, yet at the same time elastic magnesite flooring is obtained.

I have furthermore discovered that chlorid of magnesium combines only with practically anhydrous calcined magnesite, viz. the oxid of magnesium contained in calcined magnesite has to conform to the formula MgO, otherwise no oxychlorid cement will be formed, no oxychlorid being formed, and no stone hard mass resulting, if the oxid of magnesium has been hydrated by exposure to moist air, etc. On the other hand, I have succeeded in proving experimentally that sulfate of magnesium does not require a practically anhydrous oxid to make chemical combination possible; I have found that the sulfate combines also with hydrated oxid to form a hard mass. These results explain why the use of sulfate gives so much better results in cold and rainy weather, while the chlorid is preferable in dry and warm weather. These results show conclusively that the setting of a coating can be regulated by means of the use of more or less sulfate or chlorid, and that the use of an excess of chlorid is to be preferred during warm and dry weather, while the use of an excess of sulfate is preferable during the rainy season, when the air is more or less saturated with moisture.

The discovery that sulfate of magnesium combines with both hydrous and practically anhydrous oxid of magnesium, while the chlorid combines preferably with practically anhydrous oxid, I have found to be useful in the renovation of old magnesite floorings, which by the wear and tear, viz; by continued scrubbing and cleaning with water or with water containing soap and the like, have eventually become porous and weakened on the surface. I have found that the excess of oxid of magnesium, used in the manufacture of the floorings, is contained in the finished flooring in hydrated condition. I have found also that such floorings can be strengthened, in accordance with my discovery, by a treatment with salts of magnesium containing an excess of sulfate. Experiments have shown that an excess of chlorid has the tendency to weaken the flooring, owing to the hygroscopic properties of the chlorid and for the reason that the chlorid does not combine with hydrated oxid. I have found it to be of advantage in some cases to paint old worn-out floorings first with a solution of sulfate of magnesium containing a small percentage of chlorid, allowing the flooring to absorb that solution thoroughly and to get dry and then to apply the fixative coat comprising calcined magnesite, chlorid, and sulfate of magnesium and water.

If old floorings are treated as described, the sulfate of magnesium, applied first, will combine with the hydrated oxid contained in the flooring and will strengthen the interior parts of the structure, while the second or fixative coat, comprising calcined magnesite, chlorid, and sulfate of magnesium and water, will fill all the pores on or near the surface and when seasoned and dried and finished by means of oils, or oils and varnish, and the like, will give the whole flooring structure additional strength and resistance. In most of the cases it is sufficient to apply only the fixative coat, especially when the work of renovating the flooring structure has to be done in a hurry.

I do not wish to limit myself to the use of dry mixtures containing in addition to calcined magnesite, anhydrous chlorid and sulfate of magnesium, as the salts can be shipped, handled and used in the condition of an aqueous solution or in crystallized form to be mixed with the dry calcined magnesite and the additional amount of water required, at the point where the fixative is to be used. I am aware of the fact also, that a preparation comprising calcined magnesite, chlorid and sulfate of magnesium can be obtained, for immediate use, by mixing calcined magnesite with water to the consistency of thin cream, and adding, while stirring, separately, first enough sulfuric acid and then enough hydrochlorid acid to produce in the preparation the desired percentage of sulfate and of chlorid of magnesium in accordance with the following equations:

$$MgO + H_2SO_4 = MgSO_4 + H_2O$$
$$MgO + 2HCl = MgCl_2 + H_2O$$

I have discovered also that in cases, in which the dry mixture is to be shipped to distant countries, and is, however carefully packed, exposed to moisture and dampness, prevailing on sea or in semi-tropical or tropical climates, it is desirable, if more than 1 per cent. of chlorid of magnesium is required for a certain purpose, to add to the mixture comprising calcined magnesite and anhydrous sulfate of magnesium, salts like the anhydrous chlorids of the alkaline earths, which, on mixing the fixative with water, produce chlorid of magnesium *in statu nascendi*. For instance, I have found that by adding more or less anhydrous chlorid of barium, strontium, or calcium, any required proportion of chlorid of magnesium can be produced in accordance with the following reaction:

$$BaCl_2 + MgSO_4 = MgCl_2 + BaSO_4.$$

For instance the addition of about 5.68 parts of anhydrous chlorid of barium would produce together with about 3.25 parts of anhydrous sulfate of magnesium, when the fixative containing the same is mixed with water, about 5 parts of crystallized chlorid of magnesium equivalent to about 2.3 parts of anhydrous chlorid, and about 6.35 parts of insoluble sulfate of barium, which, being present in the finest precipitated condition, has the desirable tendency of entering into and filling all the little holes, fissures, and cracks of the foundation coated, thus increasing the fireproof character of the composition.

In regard to calcined magnesite I wish to state, that I mean by that term magnesite rock which has been calcined and which if not completely calcined may contain more or less of carbonate of magnesium, and the impurities met with usually in the rock, viz. aluminum oxid, iron oxid, some silica, lime, etc. Instead of calcined magnesite also partly calcined dolomite can be used viz. dolomite, in which only the carbonate of magnesium has been calcined and converted into oxid, while the carbonate of lime has not been changed. Instead of partly or wholly calcined magnesite or of partly calcined dolomite naturally also artificial mixtures of oxid of magnesium, carbonate of magnesium and carbonate of lime, generally containing the usual impurities of the respective kind or quality of rock can be used. I have found also that pigments can be added to the fixative, such as ultramarine, ocher, umber, red oxid, Venetian red, etc.; such combinations can be used effectively to give roofing paper, shingles, etc. fireproof coatings, which when applied during dry weather and properly seasoned, yield in the end a very stable coating. This composition also is valuable for the purpose of mineralizing coarse sawdust, which when combined with the fixative coating composition in the presence of water and then dried, is practically non-combustible. A further use of the fixative composition is in its application to bandages instead of plaster of Paris for surgical purposes.

While I have described several ways in which the composition can be made, I am aware that many modifications may be made therein by a skilled chemist without departing from the scope of the invention as expressed in the claims. Therefore I do not wish to be limited to the particular ingredients as above described, nor to the particular method of making the composition, but What I do claim is:—

1. A coating composition comprising oxid of magnesium, sulfate of magnesium, and an amount of chlorid of magnesium less than 6% of the amount of sulfate and sufficient water to bring it to a consistency suitable for spreading by a brush.

2. A composition of matter of the class described comprising from 60 to 70 parts by weight of calcined magnesite, from 20 to 30 parts by weight of anhydrous sulfate of magnesium, a small amount of chlorid of magnesium, and water.

3. A composition of matter of the class described comprising from 60 to 70 parts by weight of calcined magnesite, and from 20 to 30 parts by weight of anhydrous sulfate of magnesium, containing from 1 to 5% of dry chlorid of magnesium.

4. A coating composition, capable of combining with old magnesite cement to form a perfect bond and increase the durability thereof comprising water, oxid of magnesium, carbonate of magnesium, sulfate of magnesium, and the anhydrous chlorid of an alkaline earth for producing in the presence of water, chlorid of magnesium *in statu nascendi*, the amount of oxid being from two to three and one half times as much by weight as the combined amounts of sulfate and chlorid.

5. A coating composition comprising oxid of magnesium, sulfate of magnesium, the amount of oxid being from two to three and one-half times as much as the sulfate, and an amount of chlorid of magnesium less than six per cent. of the amount of sulfate.

6. A coating composition comprising oxid of magnesium, sulfate of magnesium, the amount of oxid being from two to three and one-half times as much as the sulfate, an amount of chlorid of magnesium less than six per cent. of the amount of sulfate, and about half their combined weight of water.

In testimony whereof I have hereunto set my hand, in the presence of two subscribing witnesses.

LUDWIG H. REUTER.

Witnesses:
W. J. WOOD,
F. A. PEIRCE.